B. F. FOWLER.
Grain Grader and Separator.

No. 218,726. Patented Aug. 19, 1879.

Witnesses:
John A. Hughes,
S. O. Christian

Inventor:
Benjamin F. Fowler
By J. L. Zerbe
Atty

UNITED STATES PATENT OFFICE.

BENJAMIN F. FOWLER, OF EAU CLAIRE, WISCONSIN, ASSIGNOR OF ONE-THIRD HIS RIGHT TO BENJAMIN RATHBUN.

IMPROVEMENT IN GRAIN GRADERS AND SEPARATORS.

Specification forming part of Letters Patent No. 218,726, dated August 19, 1879; application filed April 3, 1879.

*To all whom it may concern:*

Be it known that I, BENJAMIN F. FOWLER, of Eau Claire, in the county of Eau Claire and State of Wisconsin, have invented a new and useful Improvement in Grading and Separating Machines for Grain, which improvement is fully set forth in the following specification and accompanying drawings, in which—

Figure 1:
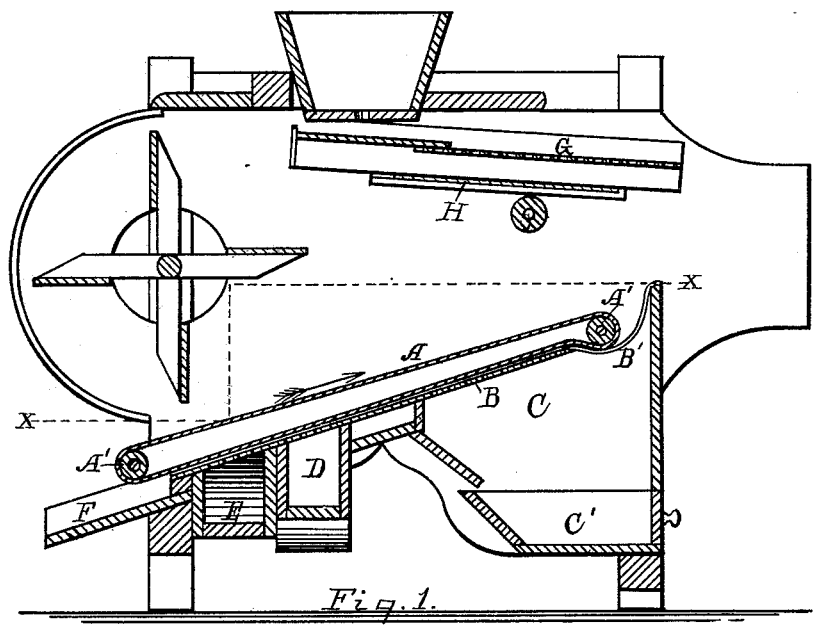
Figure 2:
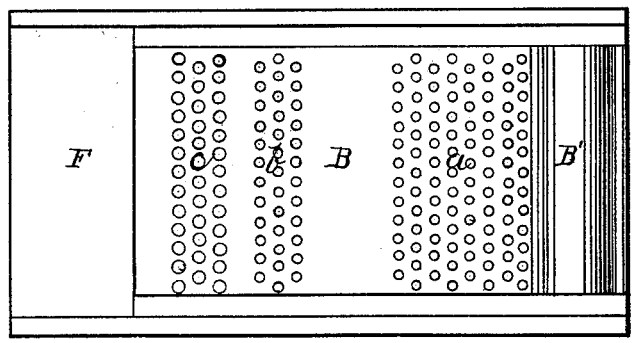

Figure 1 is a sectional view of the machine, and Fig. 2 a top view of the perforated zinc plate as seen from planes indicated by line $x$ in Fig. 1.

The object of my invention is to provide a machine which will both grade and separate wheat in a rapid and satisfactory manner; and it also provides for separating oats from wheat, as will hereinafter be more fully described.

I provide a perforated zinc plate, forming a sieve, in three parts, each part having different-sized holes, allowing different grades of wheat to pass through into the compartments below. The first portion of the sieve separates all small seeds from the grain, which fall into a seed-box underneath. An endless belt passes over this zinc sieve, and the grain, by the action of the belt, is fed between the endless belt and the sieve, thus distributing the grain in an even manner.

In the drawings, A represents an endless belt operating on two rollers, A′, the one placed somewhat above the other to give a suitable angle to the inclination of the belt.

B is a zinc sieve, divided into three series of perforations—$a$, composed of small holes, for the purpose of allowing small seed to pass through; $b$, enlarged holes, for allowing the smaller grains of wheat to pass through; and $c$, composed of still larger holes, for medium-sized grains, the large and perfect grains of wheat being allowed to pass out through spout F.

A trough, B′, formed of zinc or other material, joins the upper end of the zinc sieve B, and the upper roller, A′, of the endless belt is journaled so that its lower surface will be in the bottom of this trough or depression. The belt A, in passing around the rollers, is therefore held close to the zinc sieve, and the grain falls behind the belt A, and the belt feeds the grain evenly throughout its width, and insures the perfect distribution of the seed and the grading of the wheat.

To more fully carry out the idea of a perfect separator, it was necessary to make provision for separating oats from wheat, which cannot be done by many machines now manufactured. To accomplish this I place a perforated zinc sieve, G, in the upper part of the shaker, and beneath this a wire sieve, H, of suitable size of mesh to permit grains of wheat to pass over readily. The perforations in the zinc sieve G are sufficiently large to allow the wheat to pass through, but not oats; and since the sieve G extends beyond the trough B′, the motion of the shaker causes the oats to fall out of the machine, the wheat falling on the wire sieve H gradually passing over behind the endless belt A into the trough or depression B′, and then fed over the zinc sieve B.

The compartment C, situated directly under the perforations $a$ of the sieve B, catches the small seed, which are deposited in the seed-box C′. The smaller grains of wheat pass through the perforations $b$ into the compartment D, and the medium grains into compartment E.

During the passage of the grain from the sieve H to belt A the fan blows all chaff and fine dirt from the wheat.

Having thus described my invention, what I claim as new, and desire to secure by Letters Patent, is—

The combination, with the fan of a grading and separating machine, of an endless belt, A, trough B′, and sieve B, substantially as and for the purpose specified.

In testimony that I claim the foregoing I have hereunto set my hand this 25th day of March, A. D. 1879, in the presence of witnesses.

BENJAMIN F. FOWLER.

Witnesses:
 HENRY CARDEN,
 MELCHIOR FOX.